(12) United States Patent
Suyama et al.

(10) Patent No.: US 8,740,522 B2
(45) Date of Patent: Jun. 3, 2014

(54) SHAPING MACHINE SYSTEM AND COMPUTER PROGRAM FOR CONTROLLING A SHAPING DEVICE

(75) Inventors: Akihiro Suyama, Hamamatsu (JP); Ryo Sato, Hamamatsu (JP); Yoshimitsu Asahina, Hamamatsu (JP); Makoto Yoshida, Hamamatsu (JP)

(73) Assignee: Roland DG Corporation, Hamamatsu-Shi (JP)

( * ) Notice: Subject to any disclaimer, the term of this patent is extended or adjusted under 35 U.S.C. 154(b) by 54 days.

(21) Appl. No.: 13/457,355

(22) Filed: Apr. 26, 2012

(65) Prior Publication Data

US 2012/0230793 A1    Sep. 13, 2012

Related U.S. Application Data

(62) Division of application No. 12/411,185, filed on Mar. 25, 2009, now Pat. No. 8,355,812.

(51) Int. Cl.
*G05B 19/402* (2006.01)

(52) U.S. Cl.
CPC .................................. *G05B 19/402* (2013.01)
USPC ........... 409/219; 700/174; 700/179; 700/192; 29/563; 72/294; 348/94; 409/233; 483/3

(58) Field of Classification Search
CPC ...................................................... G05B 19/402

USPC ............... 700/174, 179, 192; 29/563; 72/294; 348/94; 409/233, 219; 483/3
See application file for complete search history.

(56) References Cited

U.S. PATENT DOCUMENTS 4,321,679 A * 3/1982 Fujie et al. ..................... 700/192
4,850,099 A * 7/1989 Scollard .......................... 29/563

* cited by examiner

*Primary Examiner* — Tejal Gami
(74) *Attorney, Agent, or Firm* — Lee, Hong, Degerman, Kang & Waimey

(57) ABSTRACT

A shaping machine system including a shaping device and a computer is provided. The shaping device includes at least one jig mount body configured for mounting a jig; a shaping tool support body configured for supporting a shaping tool; a first drive device configured for rotating the shaping tool; and a second drive device configured for driving the shaping tool support body or the at least one jig mount body or changing a posture of the shaping tool relative to the workpiece. The computer is configured for controlling the first and second drive devices according to predetermined shaping data. The computer includes a jig position measuring unit configured for measuring a position of the jig; a position error detecting unit configured for detecting a position error of the jig, and a shaping data correcting unit configured for correcting the predetermined shaping data according to a jig position error.

1 Claim, 22 Drawing Sheets

US 8,740,522 B2

SHAPING MACHINE SYSTEM AND COMPUTER PROGRAM FOR CONTROLLING A SHAPING DEVICE

CROSS-REFERENCE TO RELATED APPLICATIONS

This application is a divisional of U.S. patent application Ser. No. 12/411,185, filed on Mar. 25, 2009, now U.S. Pat. No. 8,355,812, the contents of which are hereby incorporated herein by reference.

BACKGROUND OF THE INVENTION

1. Field of the Invention

The present invention relates to shaping machine systems and computer programs for controlling a shaping device.

2. Discussion of the Related Art

Conventionally, a shaping machine system for shaping a workpiece using a computer according to predetermined data is known in the art. For example, this type of shaping machine system may include a large shaping device installed in a factory and a dedicated computer for controlling the shaping device. The shaping machine system described above requires time and effort for installing the system. Moreover, the aforementioned shaping machine system is not portable. Furthermore, the aforementioned shaping machine system requires an operator that is skilled in producing the shaping data and for operating the shaping device.

In view of the foregoing, a portable shaping machine system that may be easily installed and easily operated has been proposed. For example, JP 2006-349388 A discloses a shaping machine system furnished with a comparatively small shaping device for performing a shaping process and a microcomputer for controlling the shaping device. The microcomputer controls the shaping device according to predetermined data. The user inputs the shaping data into the microcomputer and the microcomputer may control the shaping machine system. Accordingly, the process described above allows for a shaping process to be performed more easily than the prior art.

As mentioned above, the above-described shaping machine system requires shaping data for the shaping device. The shaping data refers to the data for controlling the shaping device for shaping a workpiece into a predetermined shape. The shape of the workpiece is specified by shape data, such as coordinate values (X, Y, Z) in a three-axis rectangular coordinate system.

The shaping data may be produced in accordance with the shape data and the characteristics of the shaping device. Therefore, the user may need to know the characteristics of the shaping device in advance when producing the shaping data. Thus, expert knowledge may be required when producing the shaping data. Although the above-described shaping machine system may be operated by a layperson once the shaping data has been produced, it is difficult for a layperson to use the system without the shaping data.

It is an object of the present invention to provide a shaping machine system that may be operated to perform a shaping process based on shape data even by a user who is not an expert on producing shaping data.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment a shaping machine system is presented. The shaping machine system includes a shaping device including at least one jig mount body for mounting a jig for supporting a workpiece, a shaping tool support body for supporting a shaping tool for shaping the workpiece, a first drive device for rotating the shaping tool, and a second drive device for driving at least one of the shaping tool support body, the jig mount body, or to change a posture of the shaping tool relative to the workpiece. The shaping machine system also includes a computer including an input unit for receiving a jig selection, the jig selected from a plurality of types of jigs, and for receiving a shaping tool selection, the shaping tool selected among a plurality of types of shaping tools, a shape data reading unit for reading shape data representing a shape of the workpiece after shaping, a shaping data producing unit for producing shaping data for controlling the first and the second drive devices according to at least the type of the jig, the shape data, and the type of the shaping tool, and a drive control unit for controlling the first and second drive devices according to the shaping data.

According to one feature, the computer further includes a jig position measuring unit for measuring a position of the jig according to contact of a detection pin with the jig by controlling the second drive device to bring the detection pin in contact with the jig, a position error detecting unit for detecting a position error of the jig by comparing the jig position measured by the jig position measuring unit to a predetermined jig position, the position error being a difference between the measured jig position and the predetermined jig position, and a shaping data correcting unit for correcting the shaping data according to the jig position error. Additionally, the shaping tool support body includes a main body, a rotating body driven by the first drive device for mounting the shaping tool, and a bearing interposed between the main body and the rotating body for supporting the rotating body rotatably with respect to the main body. Furthermore, the shaping device further includes a power source for applying a voltage between the main body and the jig, and a detection meter for detecting a current value flowing between the main body and the jig via the bearing or a resistance value between the main body and the jig. Finally, the jig position measuring unit includes a detection pin moving unit for moving the detection pin supported by the rotating body toward the jig by driving the second drive device, a contact determination unit for determining that the detection pin has made contact with the jig if the current value detected by the detection meter is equal to or greater than a predetermined value or if the resistance value detected by the detection meter becomes equal to or lower than a predetermined value, and a measuring unit for measuring a position of the jig according to the position of the detection pin when the contact determination unit has determined that the detection pin has made contact with the jig.

According to another feature at least one of the moving of the detection pin by the detection pin moving unit, the determining of contact by the contact determination unit, and the measuring of the jig position by the measuring unit are performed an odd number of times greater than one, and the position error detecting unit detects the position error according to the position indicating a median value among the jig positions that have been detected the odd number of times.

According to yet another feature the moving of the detection pin by the detection pin moving unit, the determining of contact by the contact determination unit, and the measuring of the jig position by the measuring unit are each performed a plurality of times, and the position error detecting unit detects the position error according to the position indicating a most frontward value with respect to the moving direction of the detection pin among the jig positions that have been detected the plurality of times.

According to still yet another feature the jig mount body is rotatable around a predetermined rotation axis, and at least one of the plurality of jigs has a columnar shape such that a horizontal cross-sectional contour thereof comprises a circular arc having the rotation axis as its center and a linear line connecting both ends of the circular arc.

According to another feature the jig mount body is rotatable around a predetermined rotation axis, and at least one of the plurality of jigs has a frame body, having an opening penetrating in a direction perpendicular to the rotation axis for supporting the workpiece in the opening, and a support shaft extending from the frame body along the rotation axis for supporting the workpiece.

According to yet another feature the shaping tool support body is brought into electrical contact with the detection pin when the detection pin makes contact with the jig. Additionally, the shaping device further includes a frame in electrical contact with the shaping tool support body, a table for supporting the jig mount body, an insulator interposed between the table and the frame for electrically insulating the table from the frame, a power source for applying a voltage between the shaping tool support body and the table, and a detection meter for detecting a current value flowing between the shaping tool support body and the table or a resistance value between the shaping tool support body and the table. Furthermore the jig position measuring unit includes a detection pin moving unit for moving the detection pin supported by the shaping tool support body toward the jig by driving the second drive device, a contact determination unit for determining that the detection pin has made contact with the jig if the current value detected by the detection meter is equal to or greater than a predetermined value or if the resistance value detected by the detection meter is equal to or less than a predetermined value, and a measuring unit for measuring a position of the jig according to the position of the detection pin at the time when the contact determination unit has determined that the detection pin has made contact with the jig.

According to still yet another feature the shaping device further includes a table comprising a slit, and a tool sensor disposed on a side of the table with respect to the slit for detecting a mounting position of the shaping tool with respect to the shaping tool support body by making contact with a fore-end portion of the shaping tool. Additionally, a jig mount body disposed on the table and on an opposite side to the tool sensor across the slit.

According to another embodiment a shaping machine system is presented. The shaping machine system includes a shaping device including at least one jig mount body for mounting a jig for supporting a workpiece, a shaping tool support body for supporting a shaping tool for shaping the workpiece, a first drive device for rotating the shaping tool, and a second drive device for driving at least one of the shaping tool support body, the jig mount body, or to change a posture of the shaping tool relative to the workpiece. The shaping machine system further includes a computer for controlling the first and second drive devices according to predetermined shaping data, the computer includes a jig position measuring unit for measuring a position of the jig according to contact of a detection pin with the jig, by driving the second drive device in order to bring the shaping tool support body supporting the detection pin in contact with the jig, a position error detecting unit for detecting a position error of the jig by comparing the jig position measured by the jig position measuring unit to a predetermined jig position, the position error being a difference between the measured jig position and the predetermined jig position, and a shaping data correcting unit for correcting the shaping data according to the jig position error.

According to yet another embodiment a method for controlling a shaping device is presented. The method includes receiving a jig selection, the jig selected from a plurality of types of jigs for supporting a workpiece in the shaping device, reading shape data representing a shape of the workpiece after shaping, receiving a shaping tool selection, the shaping tool selected from a plurality of shaping tools, wherein the shaping tool is supported by a shaping tool support body in the shaping device, producing shaping data for controlling a first drive device for rotating the shaping tool and a second drive device for driving at least one of the shaping tool support body, the jig mount body, or to change a posture of the shaping tool relative to the workpiece, according to at least the type of the jig, the shape data, or the type of the shaping tool, and controlling the first and second drive devices based on the shaping data.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
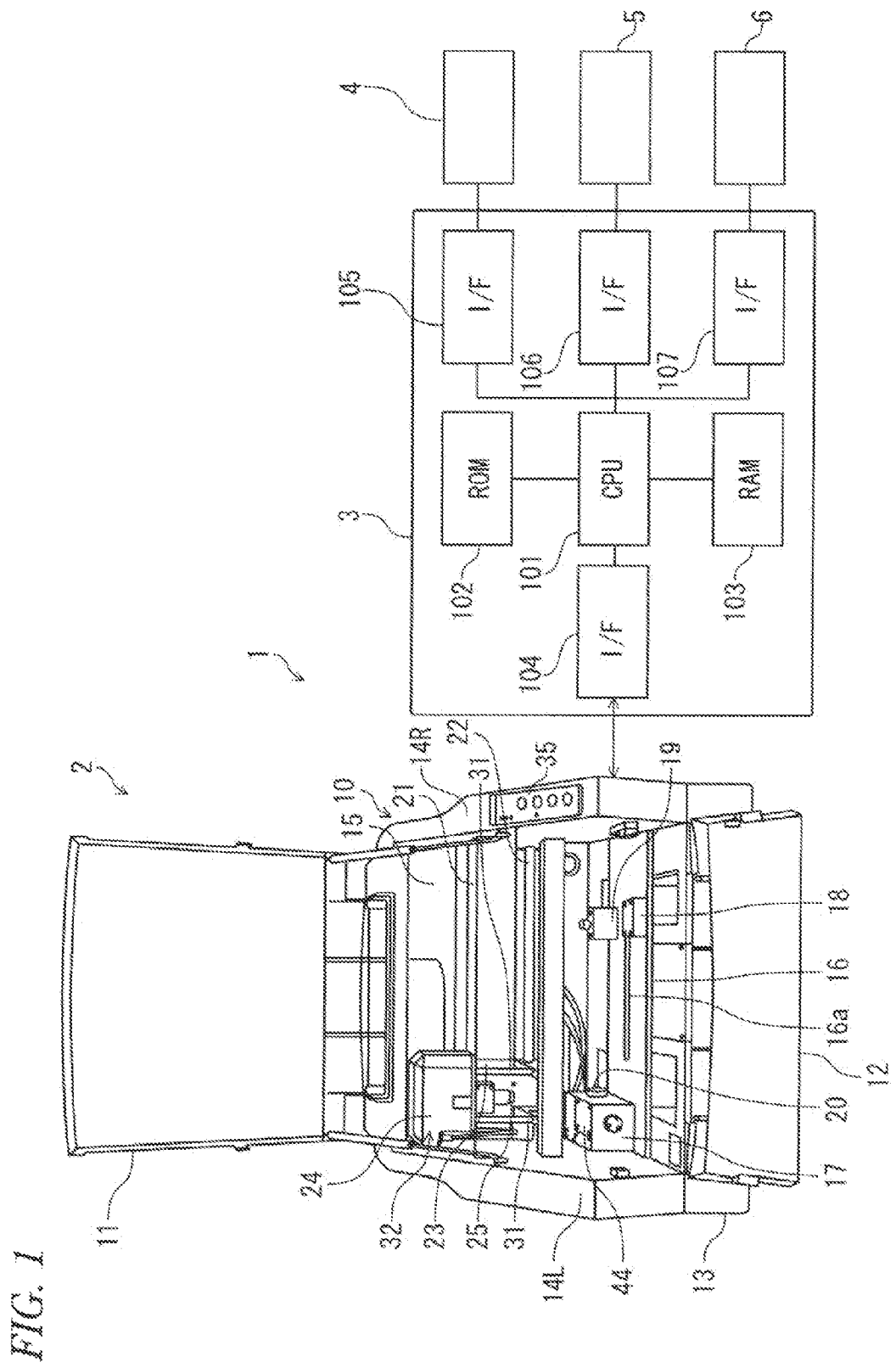
FIG. 1 illustrates a configuration diagram of a shaping machine system according to an embodiment of the present invention.

As illustrated in FIG. 1, a shaping machine system 1 may include a shaping device 2 and a computer 3. In the current embodiment of the present invention, the computer 3 may be a general-purpose computer, such as a personal computer. The computer 3 may be a separate component from the shaping device 2, and may be connected to the shaping device 2 via a wired or wireless connection for communicating with the shaping device 2. Alternatively, the computer 3 may be incorporated with the shaping device 2.

The computer 3 may include a CPU 101, a ROM 102, and a RAM 103. Although, according to the current embodiment, the ROM 102 and the RAM 103 are provided externally to the CPU 101, the ROM 102 and the RAM 103 may be integrated with the CPU 101. The computer 3 may include an interface 104 for communicating with the shaping device 2. The computer 3 may further include an interface 105 for a display 4, an interface 106 for an input device 5, such as a keyboard or a mouse, and an interface 107 for a storage device 6. The configuration of the computer 3 is not limited to the foregoing, and at least one of the display 4, the input device 5, and the storage device 6 may be incorporated in the computer 3. The storage device 6 is not limited to any particular type of storage device, accordingly, any storage device such as a hard disk, or a USB flash drive, may be suitable as a storage device.

The shaping device 2 may include a casing 10, an upper front cover 11, and a lower front cover 12. The upper front cover 11 and the lower front cover 12 may be fitted to the casing 10 and may be opened and closed. The casing 10 may include a base member 13, which is placed on a desk or a table (not shown), a left side member 14L, which stands upright on the left end of the base member 13, a right side member 14R, which stands upright on the right end of the base member 13, and a rear member 15, which stands upright on the rear end of the base member 13 and couples the left side member 14L and the right side member 14R.

The right side member 14R is provided with an operation panel 35. It is also possible to use a handy panel (not shown) connected to the shaping device 2 via a cable (not shown), in place of the operation panel 35.

Figure 2:
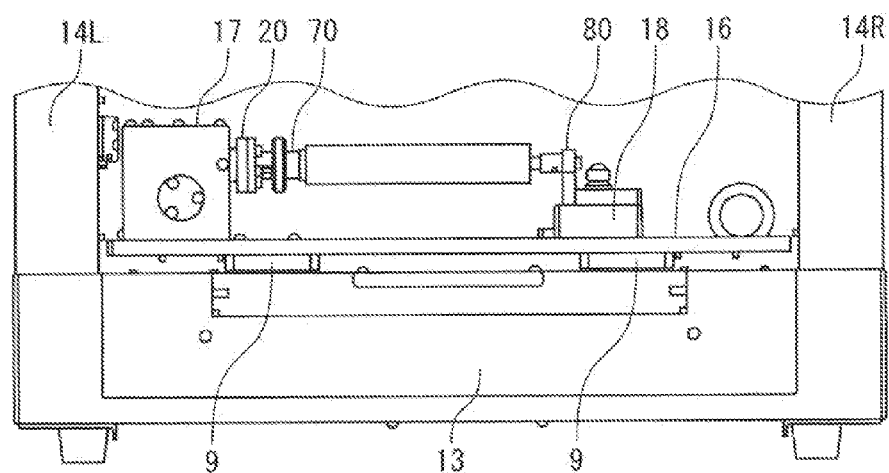
FIG. 2 illustrates a front view of a portion of a shaping device according to an embodiment of the present invention.
Figure 3:
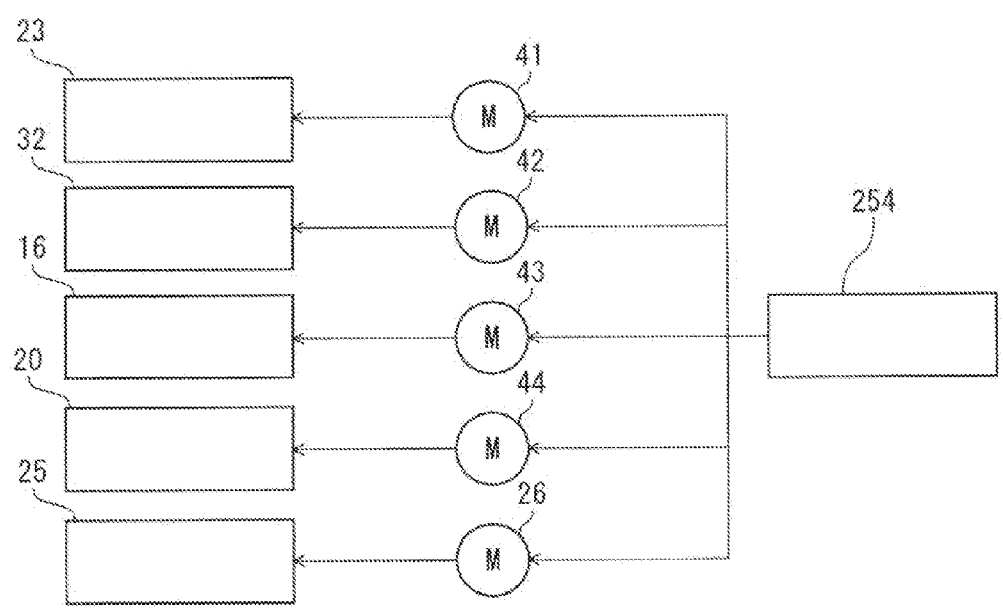
FIG. 3 illustrates a block diagram of a drive device of the shaping device according to an embodiment of the present invention.

A table 16 may be placed on the base member 13. The table 16 may be capable of moving back and forth, and is driven back and forth via a motor 43 (see FIG. 3). The table 16 is formed of an electric conductor, such as metal. As illustrated in FIG. 2, the table 16 is mounted on the base member 13 with insulators 9, the insulators 9 may be comprised of rubber or a similar substance. As illustrated in FIG. 1, a slit 16a extending horizontally is formed in a central portion of the table 16. A rotation shaft unit 17 is secured to a left end portion of the table 16. An adapter 18 for a swivel clamp is secured to a portion of the table 16 which may be on the right and more frontward than the slit 16a. The adapter 18 may be detachable from the table 16. A tool sensor 19 is secured onto a right side portion of the table 16 and may be placed behind the slit 16a. The adapter 18 may be disposed opposite to the tool sensor 19 across the slit 16a.

A guide rail 21 and a shaft 22, which extend horizontally, are secured to the left side member 14L and the right side member 14R. A carriage 23 is fitted to the guide rail 21 and the shaft 22. The carriage 23 may be slideable with respect to the guide rail 21 and the shaft 22. The carriage 23 is provided with a motor 41 (see FIG. 3), such as a drive device for moving the carriage 23 in a left or right direction. The carriage 23 may also be provided with a left-and-right pair of shafts 31 extending vertically. A spindle head 32 is fitted such that the spindle head 32 may slide upward and downward via the shafts 31. The spindle head 32 is furnished with a motor 42 for moving the spindle head 32 upward and downward.

Figure 4:
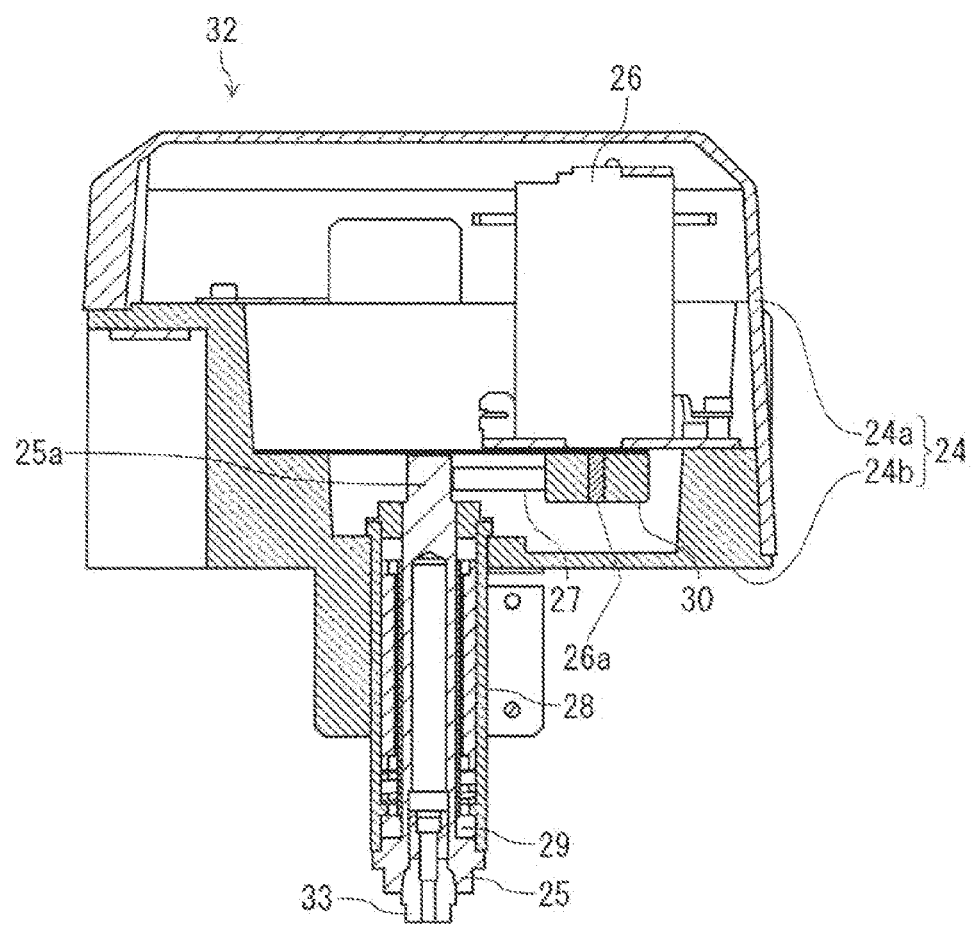
FIG. 4 illustrates a cross-sectional view of a spindle head according to an embodiment of the present invention.

As illustrated in FIG. 4, the spindle head 32 may be provided with a case 24 comprising an upper case 24a and a lower case 24b, and a motor 26 comprising a vertically extended motor shaft 26a. The motor 26 is supported by the lower case 24b. The motor shaft 26a is fitted into a roller 30. A cylinder 28 may be extended downwardly and secured to the lower case 24b. A rotation shaft 25 located inside the cylinder 28 may be supported by a ball bearing 29. An upper portion 25a of the rotation shaft 25 is coupled to the roller 30 via a transmission belt 27. Thus, the rotation shaft 25 may be driven by the motor 26 via the transmission belt 27 and the roller 30. A lower portion of the rotation shaft 25 may be formed to have a hollow shape. A collet 33 is screwed into the lower end of the rotation shaft 25. A shaping tool 8 (see FIG. 8) such as a spindle and a detection pin 90 (see FIG. 18) may be fitted to the rotation shaft 25 via the collet 33. The cylinder 28 and the rotation shaft 25 constitute a shaping tool support. The cylinder 28 constitutes a main body of the shaping tool support body, while the rotation shaft 25 constitutes a rotating body thereof.

When the detection pin 90 is fitted to the spindle head 32, the tool sensor 19 (FIG. 1) detects the vertical mounting position of the detection pin 90. After fitting the detection pin 90 to the spindle head 32, the spindle head 32 is lowered right above the tool sensor 19, and the detection pin 90 makes contact with the tool sensor 19. If the contact position is at a predetermined position, the mounting condition is acceptable, whereas if the contact position is off the predetermined position, the mounting condition is in error.

Figure 10:
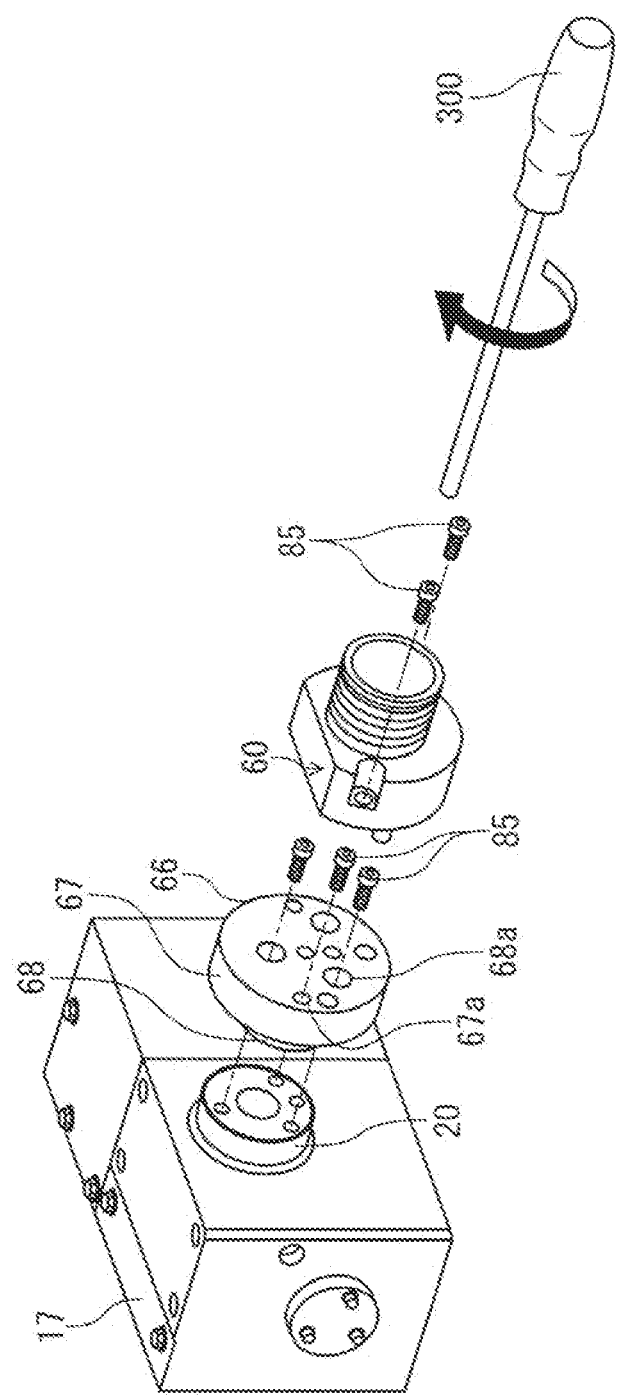
FIG. 10 illustrates a perspective view of a mounting method of the swivel clamp and an adapter according to an embodiment of the present invention.

The rotation shaft unit 17 may include a rotation shaft 20, which rotates around a horizontal axis (hereinafter referred to as an "A-axis"), and a motor 44 for driving the rotation shaft 20. The rotation shaft 20 serves as a jig mount body that is capable of mounting a plurality of jig types. As illustrated in FIG. 10, a plurality of holes for fitting cap screws 85 are formed in the rotation shaft 20. Although the following description illustrates an example in which the cap screws 85 are used as one example of a fastener, the fastener is not limited to any particular type.

The shaping device 2 may use various types of jigs. Specifically, a square clamp 50 (FIG. 5A), a swivel clamp 60 (FIG. 5B), and a tube clamp 70 (FIG. 5C) may be used as a jig for the shaping device 2. A shaping process using the aforementioned jigs will be discussed below.

Figure 5A:
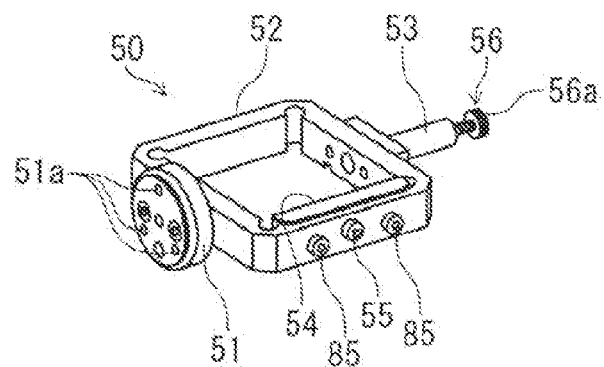
FIG. 5A illustrates a perspective view of a square clamp according to an embodiment of the present invention.

As illustrated in FIG. 5A, the square clamp 50 includes a disk 51, a rectangular frame 52, a support shaft 53, and a plate-shaped subclamp 54. The disk 51 is secured to the rotation shaft 20 of the rotation shaft unit 17. The disk 51, the frame 52, and the support shaft 53 may be arranged in the order described above such that the disk 51, the frame 52, and the support shaft 53 may be handled as one piece. A plurality of holes 51a may be formed in the disk 51, and cap screws 85 for securing the disk 51 to the rotation shaft 20 are inserted into these holes 51a. The subclamp 54 is fitted to an inner side of a front face portion of the frame 52 via a screw 55. The position of the subclamp 54 may be freely adjusted from the front of the frame 52 toward the rear of the frame 52. A screw hole (not shown) may be formed in the fore-end of the support shaft 53, and a screw 56 having a large-diameter head portion 56a is fitted into this screw hole.

Figure 6:
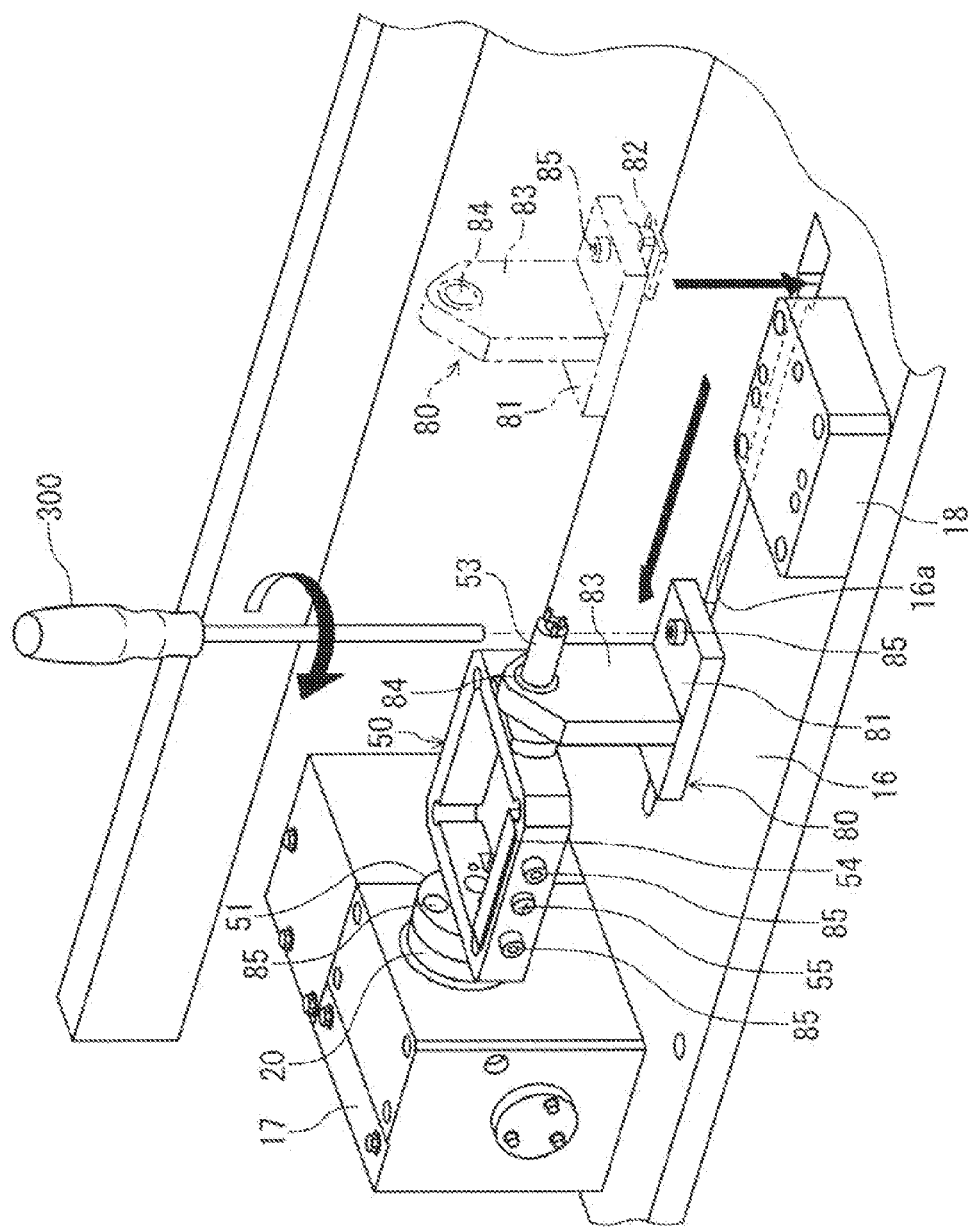
FIG. 6 illustrates a perspective view of a mounting method of the square clamp according to an embodiment of the present invention.

As illustrated in FIG. 6, a clamp holder 80 may be fitted to the table 16 for use with the square clamp 50. The clamp holder 80 supports one end of the square clamp 50. The clamp holder 80 may be furnished with a horizontal plate 81, a rail 82 provided on a lower side of the horizontal plate 81, and a vertical plate 83 provided on an upper side of the horizontal plate 81. The rail 82 may be inserted in the slit 16a of the table 16, thereby allowing the clamp holder to slide via the slit 16a. A hole 84 may formed in the vertical plate 83 for inserting the support shaft 53 of the square clamp 50. A hole may be formed at an end portion of the horizontal plate 81, parallel to the rail 82, and a cap screw 85 for securing the horizontal plate 81 to the table 16 may be fitted into the hole.

The disk 51 of the square clamp 50 is secured to the rotation shaft 20 of the rotation shaft unit 17 by the cap screw 85 in order to mount the square clamp 50. The rail 82 of the clamp holder 80 may be inserted in the slit 16a of the table 16, and the clamp holder 80 is moved along the slit 16a. The support shaft 53 of the square clamp 50 is inserted via the hole 84 in the vertical plate 83 of the clamp holder 80, and the clamp holder 80 is moved to a position where the vertical plate 83 makes contact with the frame 52. Then, the cap screw 85 is rotated with the use of a tool 300 such as a screwdriver to secure the clamp holder 80 to the table 16.

Figure 7:
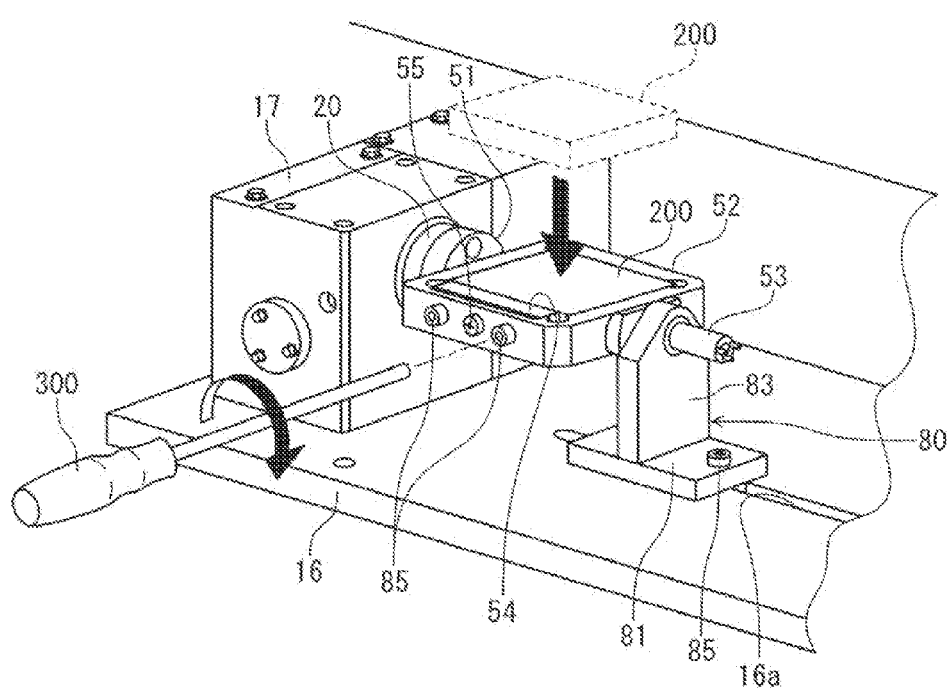
FIG. 7 illustrates a perspective view of the square clamp, which supports a workpiece in the frame according to an embodiment of the present invention.

The square clamp 50 is capable of shaping a plurality of faces of a workpiece 200 (see FIG. 7). Specifically, the square clamp 50 is capable of multi-face shaping. More specifically, the square clamp 50 is capable of two-face shaping and peripheral shaping. The term "two-face shaping" refers to shaping an obverse face and a reverse face of the workpiece 200. In the two-face shaping, the workpiece 200 is fixed in the frame 52 of the square clamp 50. After shaping the obverse face of the workpiece 200, the rotation shaft 20 is rotated approximately 180 degrees, and the square clamp 50 also rotates approximately 180 degrees, thus, allowing for shaping on the reverse face of the workpiece 200. Alternatively, the term "peripheral shaping" refers to shaping a peripheral face of the workpiece. In peripheral shaping, the workpiece is fixed onto the support shaft 53 of the square clamp 50. The peripheral face of the workpiece may be shaped sequentially rotating the rotation shaft 20.

In two-face shaping, the workpiece 200 is fitted into the frame 52, as illustrated in FIG. 7. The subclamp 54 is moved toward the far side to sandwich the workpiece 200 between the subclamp 54 and an opposing side of the frame 52. Thereby, the workpiece 200 is supported by the square clamp 50. The cap screws 85 are fitted to the frame 52 so that the position of the subclamp 54 may be adjusted by rotating the cap screws 85 using the tool 300. Specifically, the cap screws 85 are for adjusting the position of the subclamp 54. It should be noted that the screw 55 is for mounting the subclamp 54 to the frame 52, and thus, for preventing the subclamp 54 from falling from the frame 52.

Figure 8:
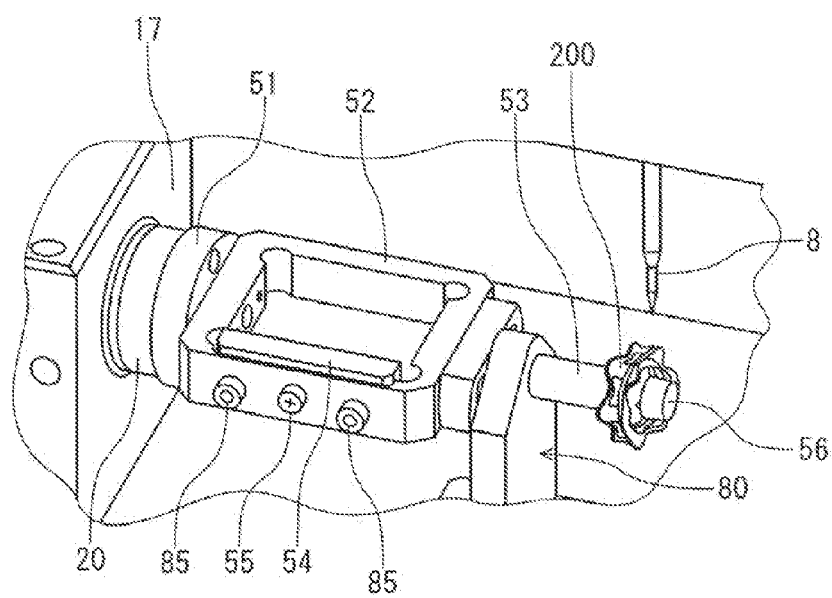
FIG. 8 illustrates a perspective view of the square clamp, which supports a workpiece on the support shaft according to an embodiment of the present invention.

As illustrated in FIG. 8, in the peripheral shaping process, the workpiece 200 is mounted onto the fore-end of the support shaft 53 and fixed by a screw 56. In the two-face shaping process, the peripheral face of the workpiece 200 cannot be shaped, however, the peripheral shaping process allows for shaping on the peripheral face of the workpiece 200. Thus, all the faces of the workpiece 200 can be shaped by combining the two-face shaping process and the peripheral shaping process. Moreover, all the surfaces of the workpiece 200 can be shaped via one jig, such as the square clamp 50.

Figure 5B:
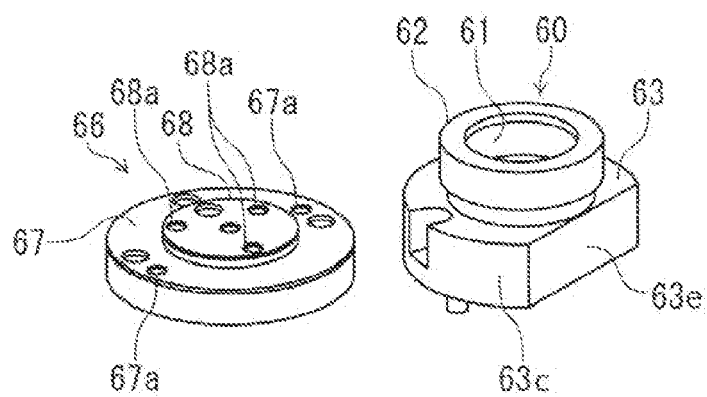
FIG. 5B illustrates a perspective view of a swivel clamp and an adapter according to an embodiment of the present invention.
Figure 9A:
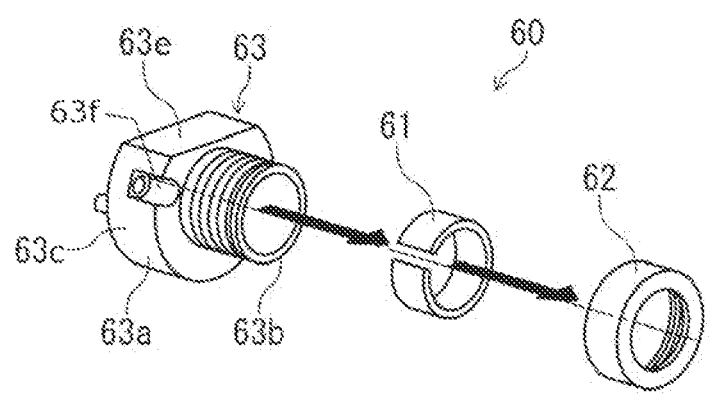
FIG. 9A illustrates an exploded perspective view of a swivel clamp according to an embodiment of the present invention.
Figure 9B:
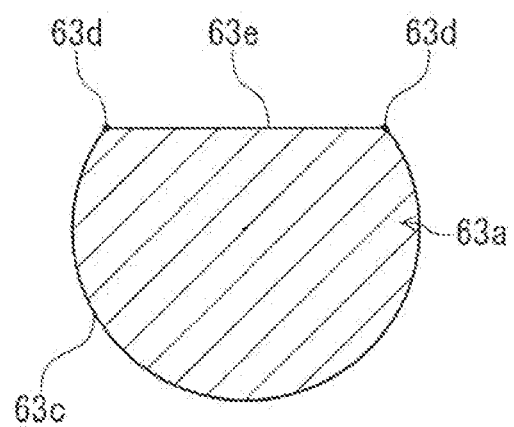
FIG. 9B illustrates a horizontal cross-sectional view of a bottom part of a clamp base according to an embodiment of the present invention.

As illustrated in FIGS. 5B and 9A, the swivel clamp 60 has a clamp base 63, a first fastening ring 61, and a second fastening ring 62. As illustrated in FIG. 9A, the clamp base 63 has a bottom part 63a including a groove 63f, and a cylindrical portion 63b on which a screw groove is formed around the outer circumference. As illustrated in FIG. 9B, the bottom part 63a has a circular shape including a circular arc 63c and a linear line 63e connecting two ends 63d, 63d of the circular arc 63c. As illustrated in FIG. 9A, the bottom part 63a has a flat surface 63e in addition to a circumferential face 63c.

The swivel clamp 60 is also capable of multi-face shaping. Specifically, the swivel clamp 60 is capable of peripheral face shaping and upper face shaping. In peripheral face shaping, the swivel clamp 60 is fixed to the rotation shaft 20 of the rotation shaft unit 17. In upper face shaping, the swivel clamp 60 is fixed to the adapter 18 on the table 16.

As illustrated in FIG. 10, an adapter 66 is used when the swivel clamp 60 is mounted to the rotation shaft 20 of the rotation shaft unit 17. As illustrated in FIG. 5B, the adapter 66 has a first disk 67 and a second disk 68 having a smaller diameter than the first disk 67. The swivel clamp 60 is mounted to the first disk 67. Holes 67a are formed in the first disk 67. Cap screws 85 for securing the swivel clamp 60 and the adapter 66 to each other are fitted into the holes 67a. The second disk 68 is mounted to the rotation shaft 20. Holes 68a are formed in the second disk 68. Cap screws 85 which penetrate through the first disk 67 and secure the adapter 66 to the rotation shaft 20 are fitted into the holes 68a. Thereby, the swivel clamp 60 is secured to the rotation shaft 20 with the adapter 66 interposed between the swivel clamp 60 and the rotation shaft 20.

Figure 11:
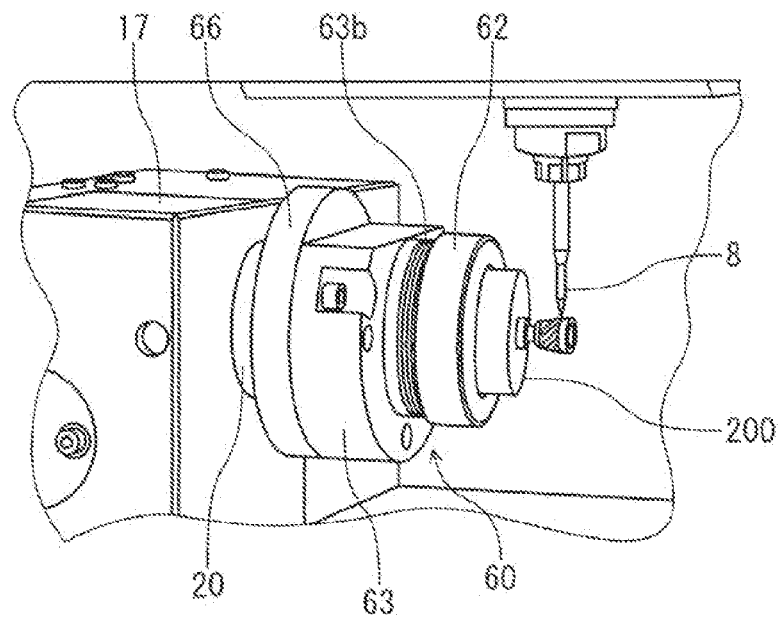
FIG. 11 illustrates a perspective view of the swivel clamp and a workpiece during peripheral face shaping according to an embodiment of the present invention.

As illustrated in FIG. 11, in the peripheral face shaping process, the workpiece 200 is oriented horizontally and is secured to the swivel clamp 60. More specifically, the columnar workpiece 200 is inserted sideward into a cylindrical portion 63b of the clamp base 63 via the second fastening ring 62 and the first fastening ring 61 (not shown). The second fastening ring 62 is tightened to the cylindrical portion 63b.

Figure 12:
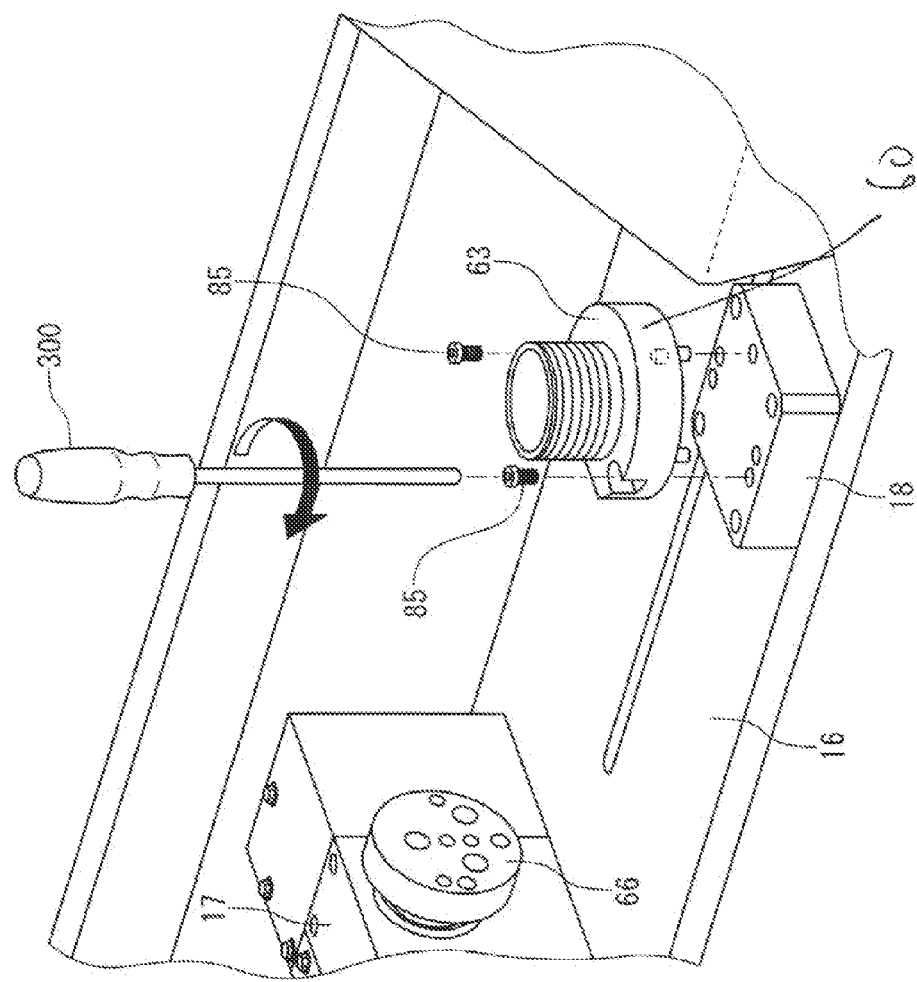
FIG. 12 illustrates a perspective view of a mounting method for mounting the swivel clamp to a table according to an embodiment of the present invention.

Alternatively, as illustrated in FIG. 12, when mounting the swivel clamp 60 to the adapter 18, the clamp base 63 is placed on the adapter 18 and secured by the cap screws 85. The swivel clamp 60 is secured to the table 16 via the adapter 18.

Figure 13:
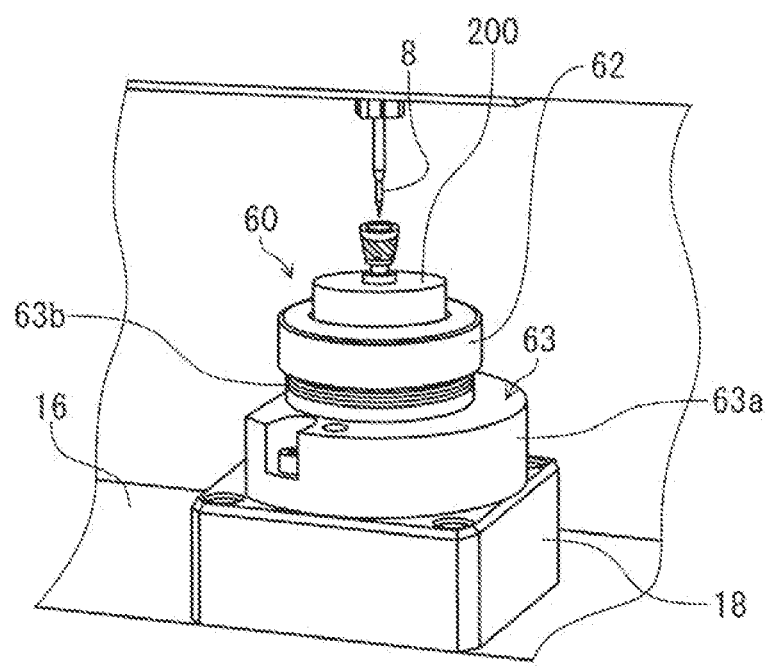
FIG. 13 illustrates a perspective view of the swivel clamp and a workpiece during upper face shaping according to an embodiment of the present invention.

As illustrated in FIG. 13, in the upper face shaping process, the workpiece 200 is secured to the swivel clamp 60 and oriented vertically. More specifically, the columnar workpiece 200 is inserted from above into the cylindrical portion 63b of the clamp base 63 via the second fastening ring 62 and the first fastening ring 61 (not shown). The second fastening ring 62 is tightened to the cylindrical portion 63b.

Figure 5C:
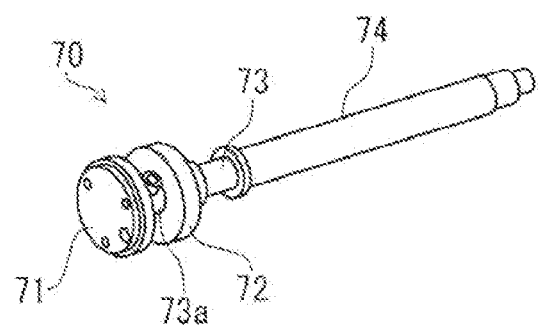
FIG. 5C illustrates a perspective view of a tube clamp according to an embodiment of the present invention.

As illustrated in FIG. 5C, the tube clamp 70 comprises an adapter 71, a wheel 72, a shaft 73, and a sleeve 74. The adapter 71 is fitted onto the rotation shaft 20 of the rotation shaft unit 17. The wheel 72 is formed into a ring-like shape. The shaft 73 penetrates through the wheel 72. A cylindrical workpiece is fitted over the sleeve 74. The sleeve 74 covers the circumference of the shaft 73, and it is supported by the shaft 73.

Figure 14:
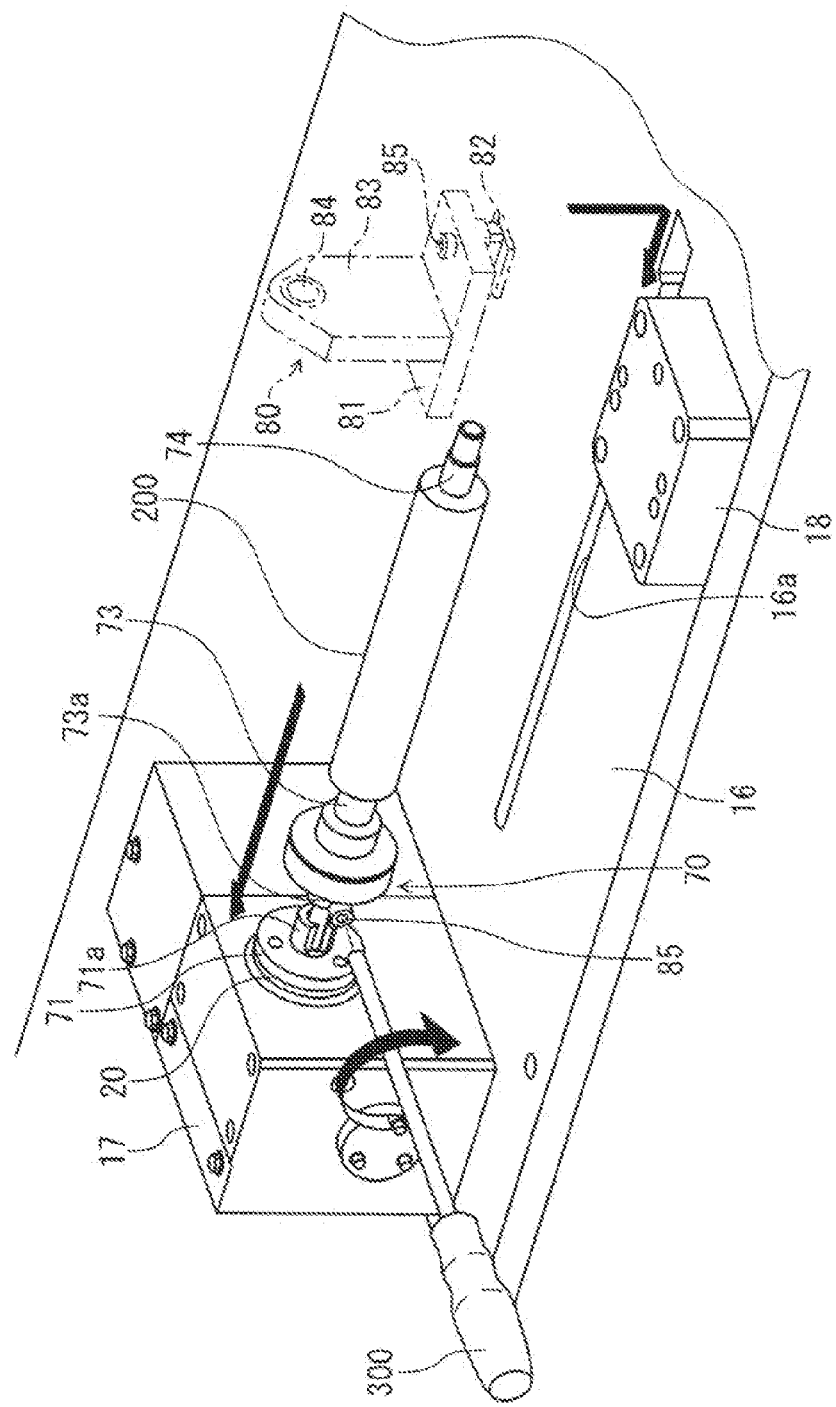
FIG. 14 illustrates a perspective view of a mounting method of the tube clamp according to an embodiment of the present invention.

The tube clamp 70 is capable of peripheral face shaping. Particularly, it is capable of peripheral face shaping along a wide range in an axial direction. As illustrated in FIG. 14, when mounting the tube clamp 70 to the rotation shaft 20, the adapter 71 is detached from the wheel 72 in advance, and the adapter 71 is mounted to the rotation shaft 20. Next, a tubular workpiece 200 is fitted over the sleeve 74. Subsequently, one end 73a of the shaft 73 is inserted into a cylindrical portion 71a of the adapter 71, and the shaft 73 is secured to the adapter 71 with a cap screw 85. Next, the rail 82 of the clamp holder 80 is inserted into the slit 16a of the table 16, and the clamp holder 80 is moved to the left along the slit 16a until the shaft 73 of the tube clamp 70 penetrates through the hole 84 in the vertical plate 83 of the clamp holder 80. Then, the clamp holder 80 is secured to the table 16 using a cap screw 85.

A method of using the shaping device 1 will be discussed. A method for manufacturing a master model using a workpiece made of wax (hereinafter referred to as "modelling wax") will be described according to an embodiment of the present invention.

Figure 15:
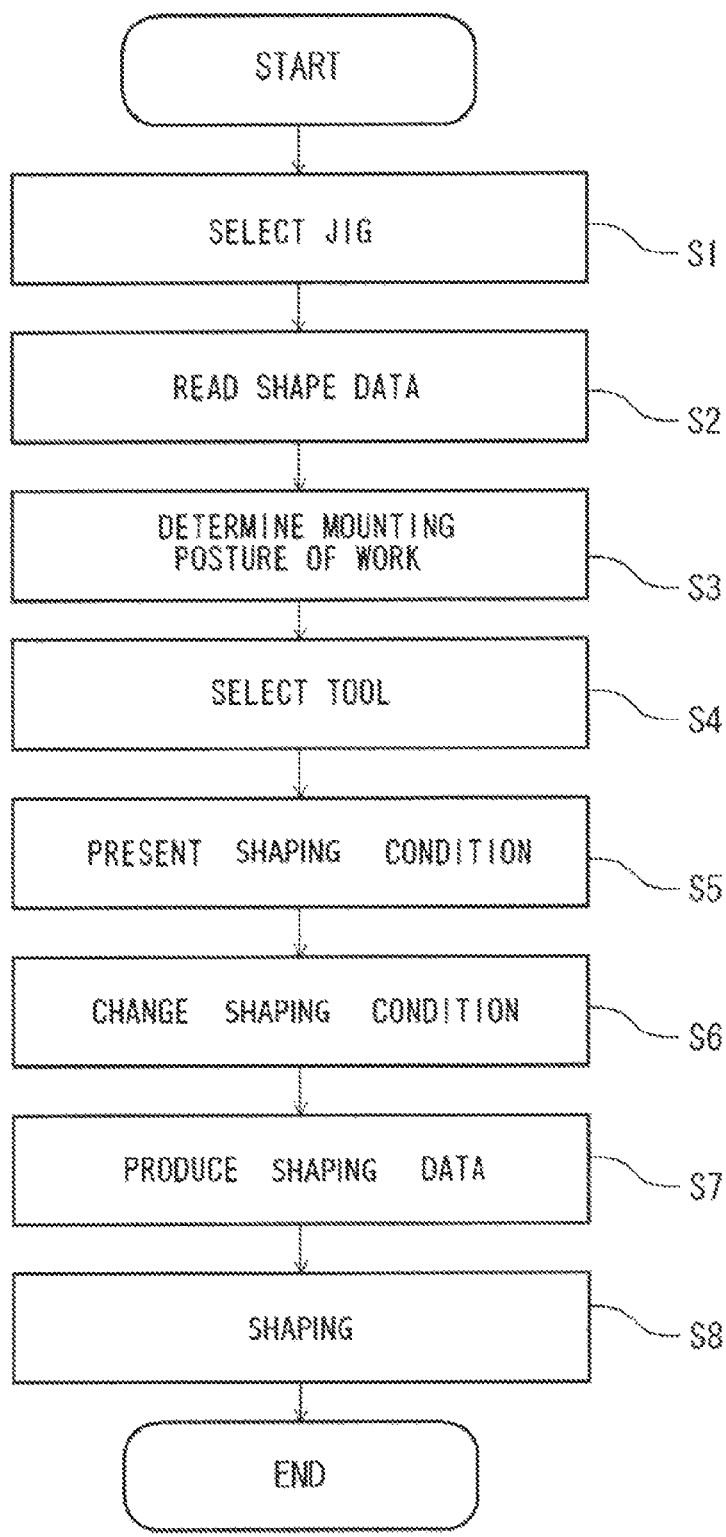
FIG. 15 illustrates a flowchart of a manufacturing method of a master model according to an embodiment of the present invention.
Figure 16:
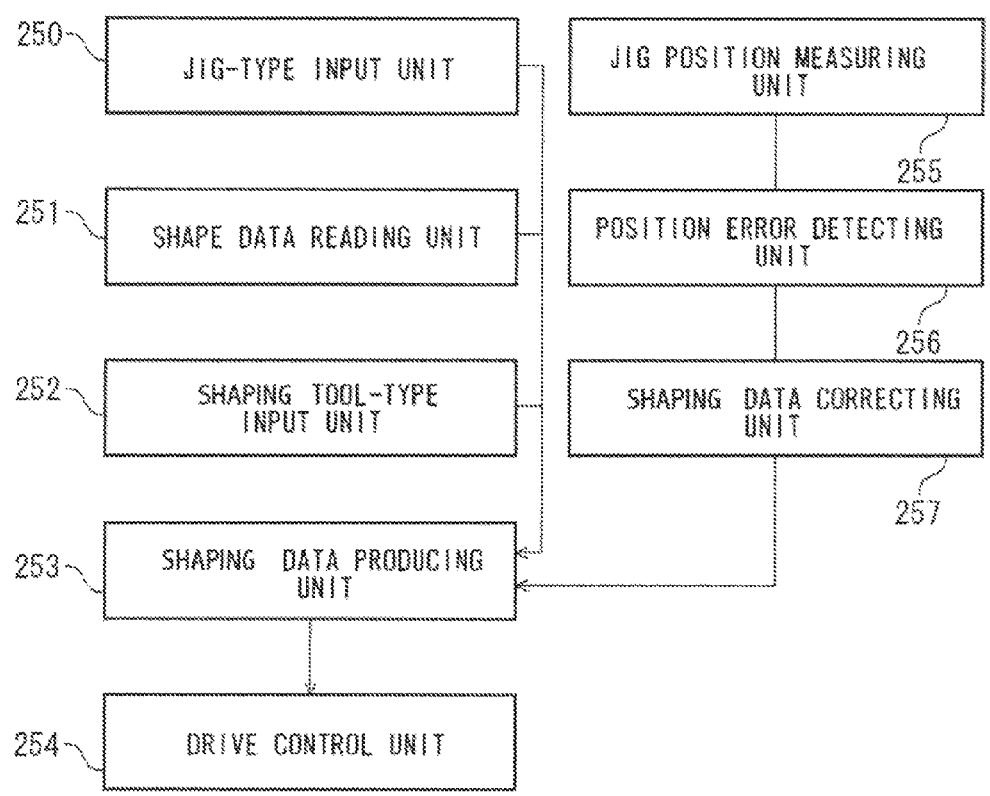
FIG. 16 illustrates a functional block diagram of a computer according to an embodiment of the present invention.

FIG. 15 is a flowchart illustrating the aforementioned manufacturing method. FIG. 16 is a functional block diagram of the computer 3 when performing the aforementioned manufacturing method. For example, shape data representing the shape of desired jewelry is required in order to manufacture a master model. Hereinafter, it is assumed that the shape data has already been created. It should be noted that the data format of the shape data is not particularly limited to any specific data format. For example, the shape data may be a set of coordinate point data in a three-axis rectangular coordinate system (X-Y-Z). The shape data may be three-dimensional data created using general-purpose CAD software programs, such as commercial software programs such as Rhimoceros and 3DESIGN. The three-dimensional data may be either data representing only the outer surface shape or data representing a three-dimensional shape as a solid body. The shape data may be handled as CAD data.

As illustrated in FIG. 15, the user selects a jig that is suitable for the shape of a desired master model (S1). Specifically, the user selects one of the square clamp 50, the swivel clamp 60, or the tube clamp 70. The user inputs the type of the jig via the input device 5 (see FIG. 1). Then, the CPU 101 of the computer 3 acquires information on which of the jigs has been selected, and controls the RAM 103 to store the information. During the process above, the CPU 101 may function as a jig type input unit 250 (See FIG. 16).

Next, the shape data is read (S2). For example, the user may connect a USB flash drive which contains the shape data to a USB socket of the computer 3. The user may then control the computer to read the data with the use of the input device 5, such as a mouse. The CPU 101 of the computer 3 reads the shape data from the USB flash drive, which is an example of the storage device 6. During the process described above, the CPU 101 functions as a shape data reading unit 251 (See FIG. 16).

The mounting posture of the modeling wax may be selected via the square clamp 50 and the swivel clamp 60. Specifically, a vertical mounting posture or a horizontal mounting posture may be selected when using the square clamp 50. For example, the vertical mounting posture refers to a mounting posture for two-face shaping (see FIG. 7) and the horizontal mounting posture refers to a mounting posture for peripheral face shaping (see FIG. 8). Additionally, when using the swivel clamp 60, a horizontal mounting posture, such as a mounting posture for peripheral face shaping (see FIG. 11) or a vertical mounting posture, such as a mounting posture for upper face shaping (see FIG. 13), may be selected.

Accordingly, the user determines a mounting posture of the modeling wax, according to the shape of the master model (S3). According to another embodiment, the computer 3 may automatically determine an appropriate mounting posture according to the shape data. Specifically, the computer 3 may propose an appropriate mounting posture according to the shape data, and the user may make a final decision based on the proposal. The mounting posture that is input by the user via the input device 5 is stored in the RAM 103 by the CPU 101.

After determining the mounting posture of the work (S3), the user selects a shaping tool (S4). The shaping device 2 may use a plurality of various types of shaping tools. For example, a plurality of end mills with different diameters may be used as the shaping tool. It should be noted that an appropriate shaping tool can be determined automatically when the shape of the master model and the mounting posture of the modeling wax are determined. Accordingly, the computer 3 may propose an appropriate shaping tool according to the shape data and the mounting posture, and the user may make a final decision according to the proposal. The shaping tool that is input by the user via the input device 5 is stored in the RAM 103 by the CPU 101. During the process described above, the CPU 101 functions as a shaping tool type input unit 252 (See FIG. 16).

The computer 3 suggests optimum or suitable shaping conditions according to the shape data, the mounting posture of the modeling wax, and the type of the shaping tool (S5). Examples of the conditions include rotation speed of the shaping tool, moving speed thereof along the X-axis, moving speed thereof along the Y-axis, and moving speed thereof along the Z-axis. More specifically, upon the input of the mounting posture and the shaping tool via the input device 5, the CPU 101 determines optimum or suitable shaping conditions according to the shape data read at S2 and the mounting posture and shaping tool. The CPU 101 suggests the shaping conditions to the user by displaying the shaping conditions on the display 4.

Next, the user may make a change to the shaping conditions as appropriate (S6). The user may change the shaping conditions via the input device 5 if the user does not agree with the proposed shaping conditions displayed on the display 4.

Figure 17:
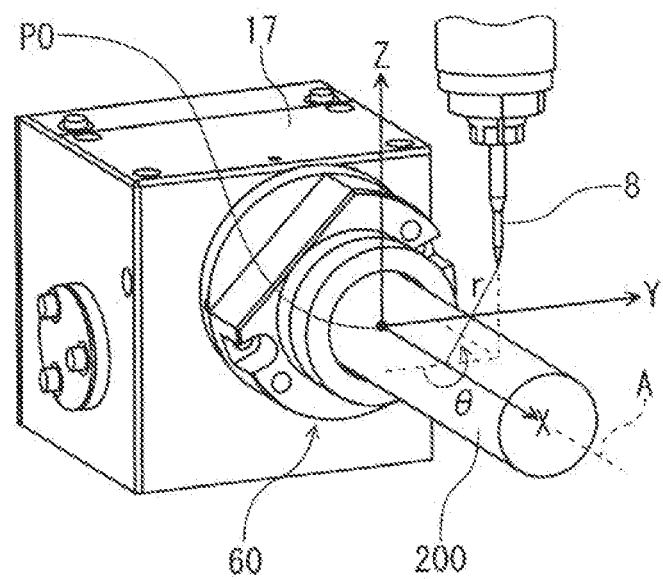
FIG. 17 illustrates a perspective view of a coordinate system according to an embodiment of the present invention.

Next, the computer 3 produces shaping data (S7). Specifically, the CPU 101 of the computer 3 creates shaping data according to the shape data, the mounting posture of the modeling wax, the type of the shaping tool, and the shaping conditions. During the process described above, the CPU 101 functions as a shaping data producing unit 253 (See FIG. 16). The shaping data refers to the data for controlling the shaping device 2, such as CAM data. Generally, the shape data may be understood by an individual, however, the shaping data is understood by a computer for processing. Therefore, the coordinate system used for the shape data and the coordinate system used for the shaping data may be different. Accordingly, if the coordinate systems are different, coordinate transformation from the coordinates used for the shape data is performed in order to produce shaping data. For example, as illustrated in FIG. 17, the three-dimensional rectangular coordinate system X-Y-Z, which is used for representing the shape data, is transformed into the coordinate system X-r-θ, which is partially used for polar coordinates. The reference character P0 refers to the point of origin. The coordinate system used for the shaping data may be determined according to the type of jig and the type of shaping tool, and it is not limited to any specific coordinate system. The coordinate system used for the shaping data and shape data may be the same.

A shaping process by the shaping device 2 may be performed once the shaping data is produced. After the shaping data has been produced (S7), the shaping process is performed (S8). Specifically, after mounting a modeling wax to the jig of the shaping device 2, shaping with the shaping device 2 is initiated according to the instruction from the user. The CPU 101 of the computer 3 controls the motors 26, 41, 42, 43, and 44 (see FIG. 3) of the shaping device 2 to manufacture a predetermined master model, such as a master mold, from the modeling wax. During the process described above, the CPU 101 functions as a drive control unit 254 (see FIG. 16).

When an error arises in the mounting posture or the mounting position of the jig, the shaping accuracy of the modeling wax degrades. Therefore, calibration of the shaping device 2 should be performed. It is preferable to perform calibration, for example, when a jig is mounted to the shaping device 2 for the first time, when the jig is replaced, when the shaping device 2 has been operated for a predetermined time, or when a predetermined number of days has elapsed since calibration was last performed.

During the calibration process of the shaping machine system 1, the shaping machine system 1 detects deviation by detecting an actual mounting position of the jig and comparing the actual mounting position to a normal mounting posture. The deviation is considered in advance, the shaping data is corrected such that the modeling wax can be formed into a predetermined shape.

Figure 18:
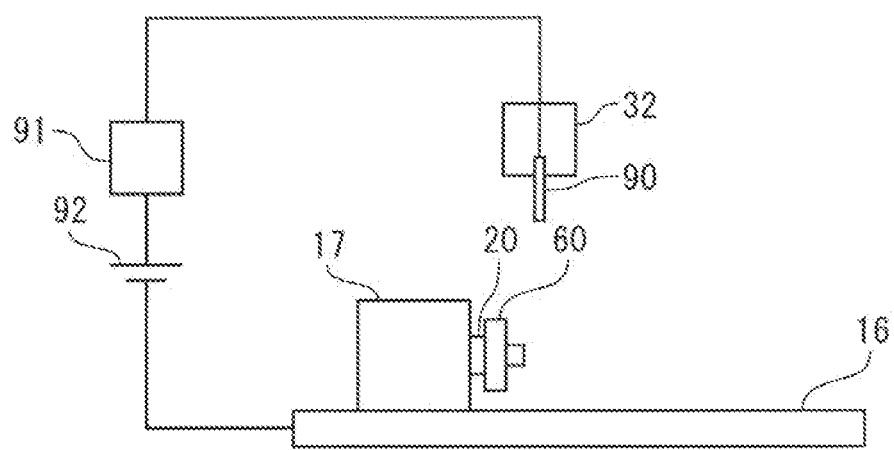
FIG. 18 illustrates a configuration diagram of a detection system for detecting a jig mounting position according to an embodiment of the present invention.

As illustrated in FIG. 18, the jig mounting position is detected with the use of the detection pin 90. In the calibration, the detection pin 90 is fitted to the spindle head 32. A jig mounting position is detected when the detection pin 90 makes contact with a plurality of locations on the jig.

The detection pin 90 includes an electric conductor, such as metal. The jigs, such as the square clamp 50, the swivel clamp 60, and the tube clamp 70 also include an electric conductor, such as metal. The jig makes electrical contact with the table 16 when mounted to a predetermined location. As described previously (see FIG. 2), the table 16 is mounted on the base member 13 with the insulators 9 interposed between the table 16 and the base member 13. The table 16 is insulated from the base member 13. According to another embodiment, as illustrated in FIG. 18, the table 16 is in electrical contact with the detection pin 90 through a detection meter 91. More specifically, the detection pin 90 is fitted to the collet 33 (see FIG. 4), which is made of metal. The collet 33 is in electrical contact with the cylinder 28, which is also made of metal, via the ball bearing 29, which is also made of metal. The table 16 is in electrical contact with the cylinder 28 via the detection meter 91.

As illustrated in FIG. 18, voltage is applied between the table 16 and the detection pin 90 of the spindle head 32 by a power source 92. Accordingly, when the detection pin 90 makes contact with a jig 60, electric current flows between the detection pin 90 and the jig 60. The detection meter 91 detects a current value flowing between the detection pin 90 and the jig 60 or a resistance value between the detection pin 90 and the jig 60. Thus, according to current embodiment, contact between the detection pin 90 and the jig 60 is detected electrically.

Figure 19:
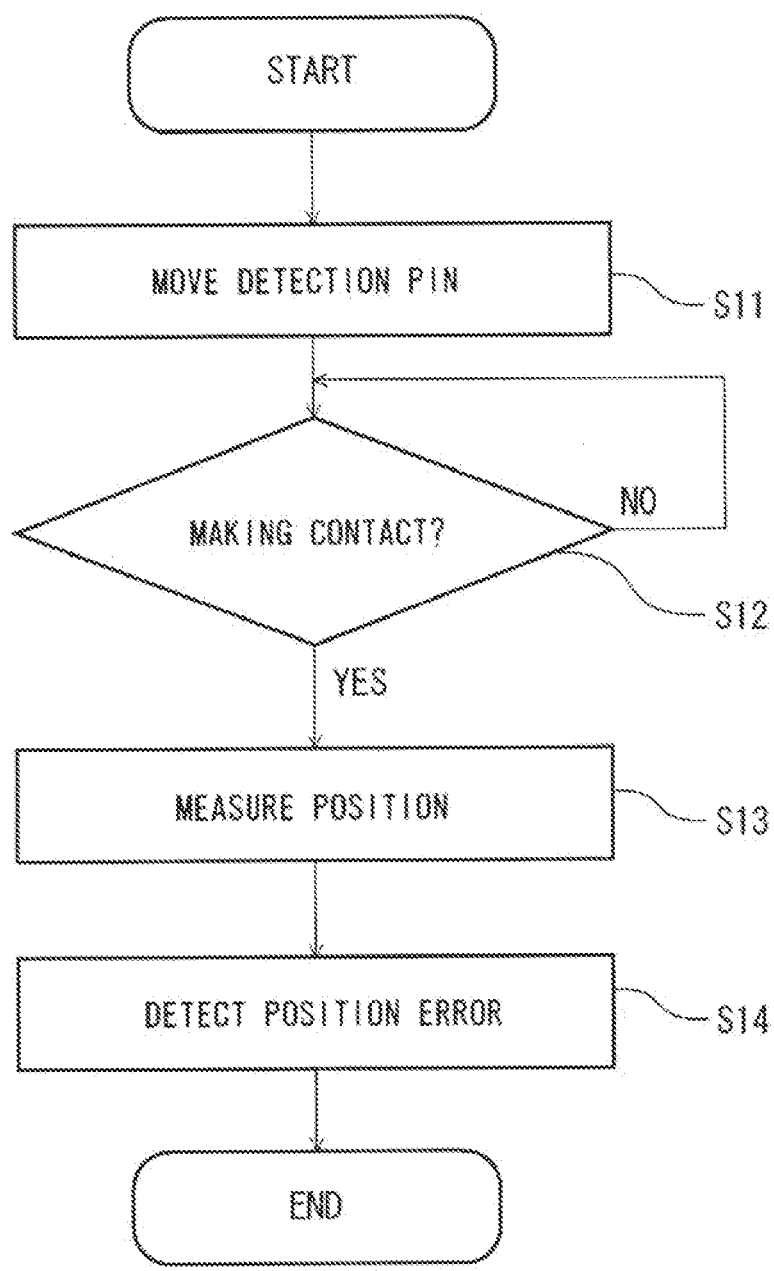
FIG. 19 illustrates a calibration flowchart according to an embodiment of the present invention.

In the current embodiment, as illustrated in FIG. 19, the detection pin 90 is moved toward a predetermined location of the jig (S11). At this time, the CPU 101 of the computer 3 functions as a detection pin moving unit. Next, it is determined if the detection pin 90 has made contact with the jig based on the current value or the resistance value (S12). For example, if the current value is equal to or greater than a predetermined value, or if the resistance value is equal to or less than a predetermined value, it is determined that the detection pin has made contact with the jig. During the process described above, the CPU 101 functions as a contact determination unit.

When it is determined that contact has been made (S12), the jig position is measured according to the position of the detection pin 90 at the time when the contact was made (S13). During the process described above, the CPU 101 functions as a measuring unit. It should be noted that the detection pin moving unit, the contact determination unit, and the measuring unit constitute a jig position measuring unit 255 shown in FIG. 16. Next, the detected jig position is compared to a normal position of the jig to detect a position error (S14). During the process described above, the CPU 101 functions as a position error detecting unit 256 (See FIG. 16).

Figure 20A:
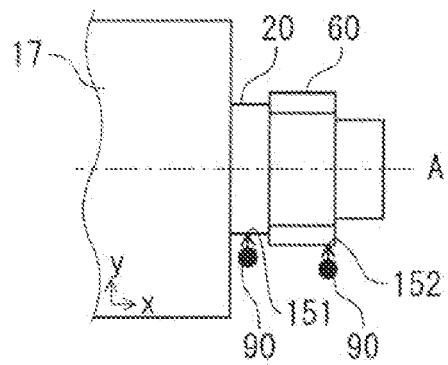
FIG. 20A illustrates a side view of contact locations of a detection pin according to an embodiment of the present invention.

The calibration will be described in detail with respect to the swivel clamp 60 mounted horizontally to the rotation shaft unit 17. First, as illustrated in FIG. 20A, the detection pin 90 contacts the rotation shaft 20. The contact point is defined as a first contact point 151. It should be noted that the rotation shaft 20 of the rotation shaft unit 17 includes an electric conductor, such as a metal. Next, the detection pin 90 is brought into contact with the swivel clamp 60. The contact point is defined as a second contact point 152. According to the current embodiment, the first contact point 151 and the second contact point 152 are on the front of the rotation shaft 20 and the swivel clamp 60. However, the first contact point 151 and the second contact point 152 are not limited to the front of the rotation shaft 20 and the swivel clamp 60, the rotation shaft 20 and the swivel clamp 60 may be contacted from an alternate position.

Figure 20B:
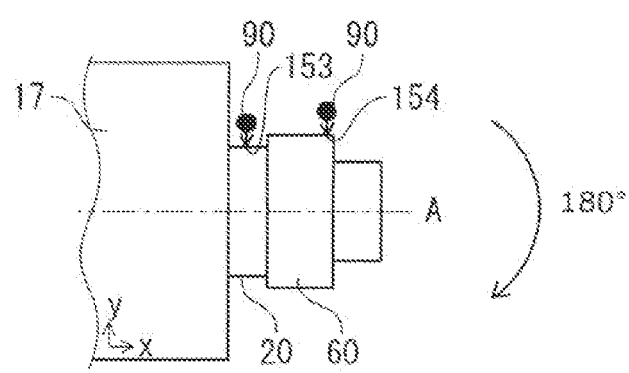
FIG. 20B illustrates a side view of contact locations of the detection pin according to an embodiment of the present invention.

Next, as illustrated in FIG. 20B, the rotation shaft 20 is rotated approximately 180 degrees from the state shown in FIG. 20A. The detection pin 90 contacts the rotation shaft 20. The contact point is defined as a third contact point 153. Next, the detection pin 90 contacts the swivel clamp 60. The contact point is defined as a fourth contact point 154. According to the current embodiment, the third contact point 153 and the fourth contact point 154 are on the rear of the rotation shaft 20 and the swivel clamp 60. However, the third contact point 153 and the fourth contact point 154 are not limited to the rear of the rotation shaft 20 and the swivel clamp 60, the rotation shaft 20 and the swivel clamp 60 may be contacted from an alternate position.

Figure 20C:
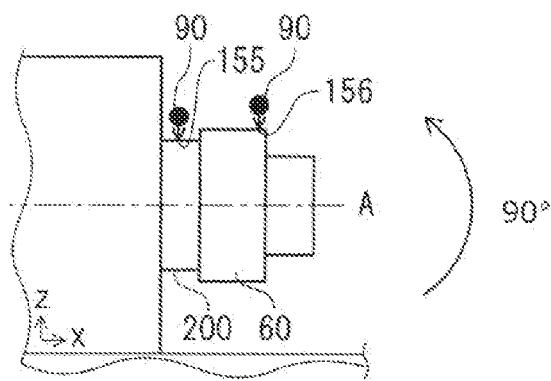
FIG. 20C illustrates a side view of contact locations of the detection pin according to an embodiment of the present invention.

Next, as illustrated in FIG. 20c, the rotation shaft 20 is rotated approximately −90 degrees from the state shown in FIG. 20B. The detection pin 90 contacts the rotation shaft 20. The contact point is defined as a fifth contact point 155. Next, the detection pin 90 contacts the swivel clamp 60. The contact point is defined as a sixth contact point 156. According to the current embodiment, the detection pin 90 contacts the rotation shaft 20 and the swivel clamp 60 from above. However, the detection pin 90 is not limited to contacting the rotation shaft 20 and the swivel clamp 60 from above, and may contact the rotation shaft 20 and the swivel clamp 60 from an alternate position.

Figure 20D:
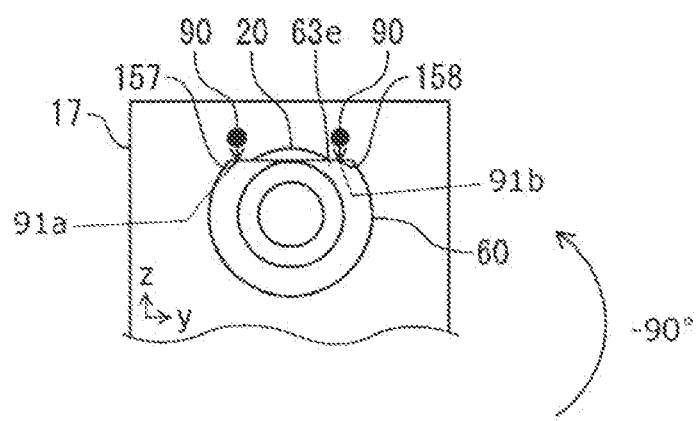
FIG. 20D illustrates a front view of contact locations of the detection pin according to an embodiment of the present invention.

Next, as illustrated in FIG. 20D, the rotation shaft 20 is rotated −90 degrees from the state shown in FIG. 20C. Note that FIG. 20D shows a front view. As illustrated in FIG. 20D, the flat surface 63e (see FIG. 5B) of the swivel clamp 60 is located upward. The detection pin 90 contacts a front side portion 91a of the swivel clamp 60. The contact point is defined as a seventh contact point 157. Next, the detection pin 90 contacts a rear side portion 91b of the swivel clamp 60. The contact point is defined as an eighth contact point 158. According to the current embodiment, the detection pin 90 contacts the swivel clamp 60 from above. However, the detection pin 90 is not limited to contacting the swivel clamp 60 from above, and may contact the swivel clamp 60 from an alternate position.

Figure 20E:
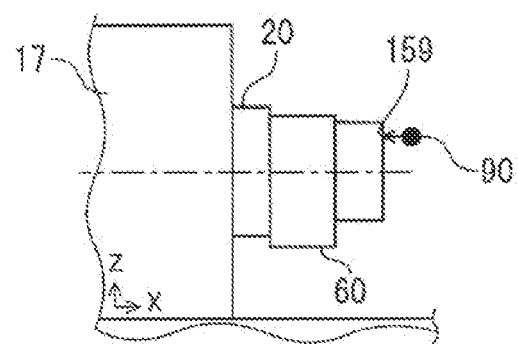
FIG. 20E illustrates a side view of a contact location of the detection pin according to an embodiment of the present invention.

Next, as illustrated in FIG. 20E, the detection pin 90 is brought into contact with the swivel clamp 60 from a side. The contact point at this time is defined as a ninth contact point 159. According to the current embodiment, the detection pin 90 contacts the swivel clamp 60 from the side. However, the detection pin 90 is not limited to contacting the swivel clamp 60 from the side, and may contact the swivel clamp 60 from an alternate position.

The data of the shape and dimensions of the rotation shaft 20 and the swivel clamp 60 are stored in a memory of the computer 3. Thus, the mounting position of the swivel clamp 60 may be detected according to the first to ninth contact points 151 to 159 (see step S13 in FIG. 19).

The CPU 101 of the computer 3 compares the detected mounting position to a predetermined normal mounting position and detects an error (see S14, FIG. 19). If there is an error, correction is made to the shaping data after producing the shaping data (S7, FIG. 15). Alternatively, corrected shaping data may be produced concurrently with the shaping data (S7, FIG. 15), without making correction after producing the shaping data. During the process described above, the CPU 101 functions as a shaping data correcting unit 257 (see FIG. 16).

As described above, contact between the detection pin 90 and the jig is detected by a current value or a resistance value between the detection pin 90 and the jig. The following method may be employed as a method for detecting resistance value between the detection pin 90 and the jig.

As illustrated in FIG. 4, the spindle head 32 includes the collet 33 for supporting the detection pin 90. The collet 33 is formed of metal. The collet 33 is rotatably supported in the cylinder 28, which is made of a metal, by the ball bearing 29. Bearing oil is provided around the ball bearing 29. Thus, the ball bearing 29 is in contact with the cylinder 28 and the collet 33 via the bearing oil. Specifically, an oil film is formed between the cylinder 28 and the ball bearing 29, and an oil film is also formed between the ball bearing 29 and the collet 33. The oil films serves as resistance between the detection pin 90 and the jig, the resistance value changes according to the film thickness.

Figure 21:
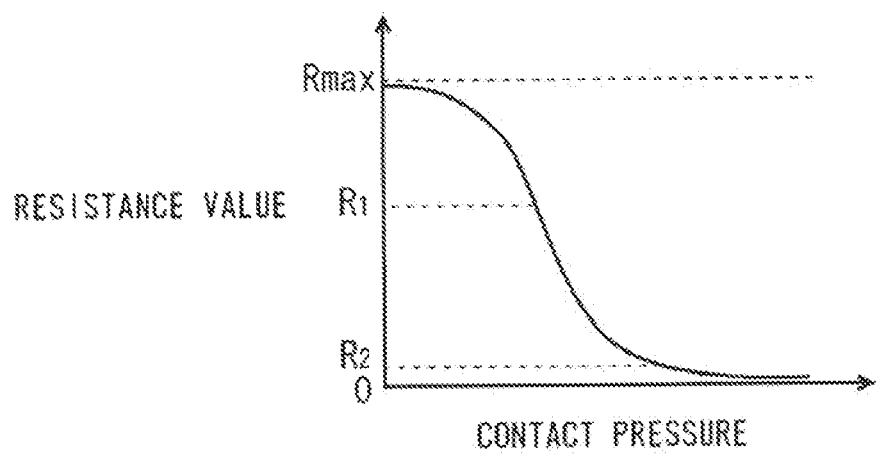
FIG. 21 illustrates a graph of the relationship between contact pressures and resistance values according to an embodiment of the present invention.

FIG. 21 is a graph for illustrating the relationship of the resistance value of the bearing oil versus the contact pressure between the ball bearing 29 and the cylinder 28 and the contact pressure between the ball bearing 29 and the collet 33. The contact pressure is low when there is a lower degree of contact between the detection pin 90 and the jig. Whereas, the contact pressure is high when there is a greater degree of contact between the detection pin 90 and the jig. The contact pressure refers to the degree of contact between the detection pin 90 and the jig. As illustrated in FIG. 21, the resistance value of the bearing oil is less when the contact pressure is greater. Therefore, a subtle contact condition between the detection pin 90 and the jig may be detected by detecting the resistance value of the bearing oil. Accordingly, contact of the detection pin 90 can be detected with high precision.

For example, contact between the detection pin 90 and the jig may be determined when the resistance value becomes equal to or less than a predetermined value R1. This enables a more accurate detection process as compared to determining that the detection pin 90 has made contact with the jig when the resistance value becomes R2 or a value near zero at which the value may be considered as substantially zero. Specifically, detection described above is similar to an analog detection by using the resistance value of the bearing oil. Additionally, the detection is more accurate than a digital detection which is made according to whether the resistance value is zero or the maximum value Rmax. Accordingly, the detection meter 91 may be configured to detect the resistance value of the bearing oil.

It should be noted that because of its higher accuracy, the detected values tend to vary when an analog detection is performed. Specifically, the detected positions of the contact points 151 to 159 tend to vary. For this reason, the detection for each of the contact points may be performed more than once, and the positions of the contact points may be determined according to the detected results obtained over the plurality of times. For example, each of the contact points may be detected three times, and a median value of the detected values may be used. Specifically, when the detected values are a large value, a middle value, and a small value, the middle value of the detected values is used. When the same value is detected two or more times, that detected value is taken as the detection value indicating the median value. The method described above using a median detected value is not limited for the case in which the detection for each of the contact points is carried out three times. The method described above may be performed when the detection for each of the contact points is performed at an odd number of times. Accordingly, the method described above allows for a more precise determination of the real positions of the contact points.

It is not particularly necessary to detect the error after determining the position of the contact point, and it is also possible to carry out a series of detection operations for the position errors an odd number of times equal to or greater than three times and to take the median position error as the real position error. Specifically, the moving of the detection pin, the determining of contact, the detection of the contact point, and the detection of the position error may be performed an odd number of times equal to or greater than three times, and the position error indicating the median value may be employed as the real position error. In this case as well, the position error can be determined more accurately.

Additionally, each of the contact points may be detected more than once and the position error based on a detected value indicating the most frontward value with respect to the moving direction of the detection pin 90 may be determined. Here, the term "the most frontward value with respect to the moving direction" refers to the value that is farthest away from the jig when the detection pin 90 is moved toward the jig. For example, the value may indicate the most rearward position when the detection pin 90 is moved toward the jig from the rear, and the value may indicate the most frontward position when the detection pin 90 is moved toward the jig from the front. Accordingly, the real position error may be detected more accurately by detecting the position error according to the most frontward value with respect to the moving direction.

As described above, in the shaping machine system 1 according to the current embodiment, the shaping data producing unit 253 produces the shaping data automatically when the type of the jig is input into the jig type input unit 250 (FIG. 16) of the computer 3, the shape data reading unit 251 reads the shape data of the jewelry, and the shaping tool type is input into the shaping tool type input unit 252. Then, the drive control unit 254 controls the shaping device 2 according to the shaping data. As a result, the modeling wax is cut according to the shape of the jewelry, so the jewelry master model can be obtained. Thus, with the shaping machine system I, it is not necessary for the user to produce the shaping data from the shape data. Therefore, even a user who does not have expert knowledge about shaping data can conduct a shaping process based on the shape data. For example, by using the present shaping machine system 1, it becomes possible for a jewelry designer without expert knowledge about the shaping device 2 to produce a jewelry master model in a predetermined shape.

Moreover, according to the current embodiment, calibration of the shaping device 2 is performed, and the shaping data is corrected by the shaping data correcting unit 257 of the computer 3 when an error occurs in the jig mounting position. Therefore, a user without expert knowledge of the shaping device 2 can obtain highly accurate shaping data.

As described above, it is possible to accurately detect the contact between the detection pin 90 and the jig by using the resistance value of the bearing oil around the ball bearing 29 in the calibration.

The accuracy of the detection for the position error can be further improved if at the time of the calibration, the measurement of the position of the jig is performed an odd number of times and the jig position error is detected according to the position indicating the median value among the detected jig positions.

According to the present embodiment, the rotation shaft 20 of the rotation shaft unit 17 is rotatable around the horizontal axis. Therefore, at the time of the calibration, the rotation angle position θ (see FIG. 17) of the swivel clamp 60 around the horizontal axis can be easily and accurately detected by contacting the detection pin 90 with at least two locations on the flat surface 63e of the swivel clamp 60 as illustrated in FIG. 20D.

In the shaping device 2, both the tool sensor 19 and the adapter 18, which is an example of the jig mount body, are disposed on the table 16. However, the adapter 18 is disposed at the opposite side to the tool sensor 19 across the slit 16a. As a result, the size of the table 16 can be more compact in comparison to when the adapter 18 and the tool sensor 19 are disposed on the same side with respect to the slit 16a. Accordingly, the size of the shaping device 2 can be reduced.

The insulators 9 are provided between the table 16 and the base member 13 of the shaping device 2, so that the table 16 and the base member 13 are insulated from each other. As illustrated in FIG. 18, the table 16, the rotation shaft 20, and the jig are electrically in contact with each other, and the table 16 and the detection pin 90 are electrically in contact with each other via the power source 92 and the detection meter 91. Thus, the detection pin 90 is in electrical contact with the rotation shaft 20 and the jig via the table 16. This makes it possible to perform electrical contact determination between the detection pin 90 and the jig even when the jig is placed at any location on the table 16. If the table 16 is in electrical contact with the base member 13 and is electrically grounded via the base member 13, the detection pin 90 must be brought into electrical contact with a jig to another jig. In contrast, according to the current embodiment, the table 16 is electrically insulated from the base member 13 and the detection pin 90 is in electrical contact with the table 16. Therefore, the above-described electrical contact determination can be performed even when the jig is placed at any position on the table 16, as long as the jig is in electrical contact with the table 16.

According to the current embodiment, the dedicated detection pin 90 is used for detecting the mounting posture and mounting position of the jig. However, in another embodiment, it is possible to perform the detection using a shaping tool, if the shaping tool is made of an electric conductor. According to what is known in the art, the shaping tool used is made of a metal. Therefore, it is possible to perform the above-described detection using the shaping tool as opposed to the detection pin 90.

The computer readable medium that stores the computer program may be any type of storage medium, such as magnetic disks, optical disks, harddisk drives, and semiconductor memory devices.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A shaping machine system comprising:
   a shaping device comprising:
   at least one jig mount body configured for mounting a jig to support a workpiece, a shaping tool support body configured for supporting a shaping tool for shaping the workpiece, a first drive device configured for rotating the shaping tool, and a second drive device configured for driving the shaping tool support body or the at least one jig mount body or changing a posture of the shaping tool relative to the workpiece;
   a detection pin provided at the shaping tool support body; and
   a computer for controlling the first and second drive devices according to predetermined shaping data, the computer comprising:

a jig position measuring unit configured for measuring a position of the at least one jig mount body according to a contact of the detection pin with the at least one jig mount body when the shaping tool support body is positioned relative to the at least one jig mount body, a position error detecting unit configured for detecting a position error of the at least one jig mount body by comparing the measured. position of the at least one jig mount body to a predetermined position of the at least one jig mount body, the position error being a difference between the measured position and the predetermined position, and a shaping data correcting unit configured for correcting the shaping data according to the jig position error of the at least one jig mount body;

the shaping tool support body is brought into electrical contact with the detection pin when the detection pin makes contact with the at least one jig mount body; and the shaping device further comprises:
  a frame that makes electrical contact with the shaping tool support body, a table configured for supporting the at least one jig mount body, an insulator interposed between the table and the frame and configured for electrically insulating the table from the frame, a power source configured for applying a voltage between the shaping tool support body and the table, and a detection meter configured for detecting a current value flowing between the shaping tool support body and the table or detecting a resistance value between the shaping tool support body and the table; and the jig position measuring unit comprises:
  a detection pin moving unit configured for moving the detection pin supported by the shaping tool support body toward the at least one jig mount body by driving the second drive device, and a contact determination unit configured for determining that the detection pin has made contact with the at least one jig mount body when the current value detected by the detection meter is equal to or greater than a predetermined value or when the resistance value detected by the detection meter is equal to or less than a predetermined value.

* * * * *